(12) United States Patent
Alexander et al.

(10) Patent No.: US 7,000,136 B1
(45) Date of Patent: Feb. 14, 2006

(54) EFFICIENT VARIABLY-CHANNELIZED SONET MULTIPLEXER AND PAYLOAD MAPPER

(75) Inventors: Thomas Alexander, Mulilno, OR (US); David Wong, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 617 days.

(21) Appl. No.: 10/176,230

(22) Filed: Jun. 21, 2002

(51) Int. Cl.
*H04L 5/00* (2006.01)
*H04L 12/28* (2006.01)
*H04J 3/04* (2006.01)

(52) U.S. Cl. .................... 713/400; 370/907; 370/916
(58) Field of Classification Search ............... 713/400; 710/51, 45, 66; 370/537, 907, 916, 466
See application file for complete search history.

(56) References Cited

U.S. PATENT DOCUMENTS

| | | | | |
|---|---|---|---|---|
| 3,676,846 A | * | 7/1972 | Busch ......................... | 714/749 |
| 3,747,070 A | | 7/1973 | Huttenhoff | |
| 3,812,467 A | | 5/1974 | Batcher | |
| 4,162,534 A | | 7/1979 | Barnes | |
| 4,301,316 A | * | 11/1981 | Young ......................... | 585/455 |
| 4,309,754 A | | 1/1982 | Dinwiddie, Jr. | |
| 5,016,011 A | | 5/1991 | Hartley et al. | |
| 5,079,770 A | * | 1/1992 | Scott ........................... | 370/536 |
| 5,311,505 A | * | 5/1994 | Antoine ....................... | 370/449 |
| 6,310,891 B1 | * | 10/2001 | Dove et al. .................. | 370/470 |
| 6,424,651 B1 | * | 7/2002 | Chan et al. .................. | 370/395.6 |
| 6,704,315 B1 | * | 3/2004 | Besset-Bathias ............. | 370/395.4 |

OTHER PUBLICATIONS

U.S. Appl. No. 09/812,821, filed Mar. 2001, Alexander et al.

* cited by examiner

*Primary Examiner*—Thomas Lee
*Assistant Examiner*—Ji H. Bae
(74) *Attorney, Agent, or Firm*—Curtis B. Bechmann; Dennis R. Haszko; Borden Ladner Gervais LLP

(57) ABSTRACT

The present invention provides a multiplexed payload system for processing data organized in any interleaved framing structure, preferably SONET. Along a receive path, the system consists of an input shift register, an input multi-stream merge network, a time-sliced processing unit, and a context memory. Similarly, along a transmit path, the system consists of an output shift register, an output multi-stream merge network, a time-sliced processing unit, and a context memory. The transmit path functions in an identical manner to the receive path but in the reverse direction. The multi-stream merge network, in either direction, converts between spatially separated input data streams of various configurable widths and time-division-multiplexed streams of constant width. The input shift register and the output shift register serve to accept a serial stream of bytes from the data receiver and convert them to a parallel stream of bytes presented to the input multi-stream merge network, or to accept a parallel stream of bytes from the output multi-stream merge network and convert them to a serial stream of bytes to the data transmitter, respectively. The context memory stores the processing contexts for sub-rate payload streams derived from the serial stream of bytes. A separate context memory location is assigned to each sub-rate payload stream that is received or transmitted. The time-sliced processing unit retrieves processing contexts from the context memory in a fixed sequence and uses the processing contexts to process data presented by the input multi-stream merge network, or generate data presented to the output multi-stream merge network.

19 Claims, 5 Drawing Sheets

EFFICIENT VARIABLY-CHANNELIZED SONET MULTIPLEXER AND PAYLOAD MAPPER

FIELD OF INVENTION

The present invention relates to multiplexing and processing the payload of a multiplexed frame structure, such as a SONET frame stream.

BACKGROUND TO THE INVENTION

The Synchronous Optical Network (SONET) was created as the standard fiber optic transmission system for long-distance telephone and data communications. SONET is most commonly described as a high bit-rate fiber-optic-based transport method that provides the foundation for linking high-speed ATM (Asynchronous Transfer Mode) switches and multiplexers and providing users with B-ISDN (Broadband—Integrated Services Digital Network) compliant services. SONET has a very detailed architecture and also comprises a series of protocols to implement this architecture. As the architecture is quite complex, this document will only describe those portions of the protocols and frame structure which are useful for explanation purposes.

First, the SONET hierarchy consists of a number of levels, organized according to data transmission speed. Each level has an optical carrier (OC) and an electrical level transmission frame structure, termed the synchronous transport signal (STS). The notation OC-N refers to the $n^{th}$ level of the optical carrier. The counting units are the basic 51.84 Mbps bit rate of OC-1. OC-3, for example, has a bit rate of 155.52 Mbps which is derived from the 3 times multiplier of OC-1. The STS-N notation follows that of the OC-N. For example, an STS-3 frame is sent on an OC-3 fiber link at 155.52 Mbps. The payload, a term commonly referred to, is used to indicate user data within a SONET frame.

SONET physical layer devices are often required to handle multiplexed SONET frame formats. In these frame formats, several lower-rate SONET data streams are byte-multiplexed to construct a higher-rate SONET stream. For example, it is possible to combine four STS-48 SONET frame streams (each running at 2.488 Gb/s) to create a single STS-192 SONET stream at 9.952 Gb/s by byte-interleaving: each set of four consecutive bytes within the STS-192 stream is drawn from the four STS-48 streams, taken in turn. A similar process can be used to produce an STS-192 stream from sixteen STS-12 streams at 622.08 Mb/s, or from some combination of STS-48 and STS-12 streams, and so on.

The American National Standards Institute (ANSI) T1.105-1995 standard, titled "Synchronous Optical Network (SONET)—Basic Description including Multiplex Structure, Rates and Formats," further elaborates on the SONET frame formats and the data rates previously mentioned.

Processing such multiplexed frame streams presents a particular challenge as the data rates increase. On the receive side of the physical layer device, it is necessary to split the higher-rate SONET stream apart into the individual sub-streams and then to process each sub-stream separately. A reverse problem occurs on the transmit side. Using the traditional approach of dedicating a processing element to each individual sub-stream can result in a significant amount of hardware overhead. For example, implementing a device to process all possible valid combinations of lower-rate channels within an STS-192 would require 277 individual payload processors (1×STS-192, 4×STS-48, 16×STS-12, 64×STS-3, and 192×STS-1). Also, at any one time many of these processors would be inactive. This approach therefore leads to significant hardware inefficiencies as well.

DESCRIPTION OF THE PRIOR ART

In the prior art, the U.S. Pat. No. 3,747,070, issued to Huttenhoff, discloses an apparatus to transfer digital data in parallel from one position in an input data word to a different position in a data word. Essentially, Huttenhoff teaches the utilization of cascaded stages to shift data in the input words. The cascaded stages were utilized to combine signal paths which are in parallel. Huttenhoff does not teach the optimization of these techniques to a higher-rate SONET stream, for example.

The U.S. Pat. No. 3,812,467, issued to Batcher, discloses a permutation network capable of handling multiple modes of data accessing while a particular system is in operation. The permutation network, taught by Batcher, both arranges the order of incoming data and shifts the data such that entire data fields may be shifted.

The U.S. Pat. No. 4,162,534, issued to Barnes, discloses an alignment network, or permutation network, for use with a parallel data system. The network provides a selectively direct data flow while concomitantly shifting or transposing the data flow.

Both the U.S. Pat. No. 3,812,467 and the U.S. Pat. No. 4,162,534 have laid the foundation for handling input data from multiple input streams.

In U.S. Pat. No. 4,309,754, issued to Dinwiddie Jr., a data interface mechanism which interfaces between input and output data buses of different data widths is disclosed. This mechanism requires a finite number of random access storage units and means to access data stored in the storage units. While the mechanism interfaces between those data buses, Dinwiddie does not address the processing of parallel input buses of variable data widths, particularly input data having a variable-sized payload portion.

In U.S. Pat. No. 5,016,011, issued to Hartley et al., a processing system for converting a parallel data stream into a serial data stream is disclosed. While Hartley teaches the conversion of a parallel input data stream, the multiplexing and conversion of multiple streams, and their respective payload information, is not taught.

An alternative solution in the prior art would be to use some form of time-sliced arrangement, whereby a small number (preferably one) of payload processors would be combined with some kind of dynamic context switching capability to create the effect of multiple different payload processors. Accordingly, a single time-sliced state machine with 48 contexts would be used to emulate a set of 48 separate state machines for processing the 48 STS-1 or 16 STS-3c sub-rate streams that can be packed into an STS-48 frame stream. This solution reduces the amount of hardware resources needed, as well as increases the flexibility and efficiency of the physical layer device.

A significant issue with the use of time-sliced state machines, however, is that this approach is difficult to adapt to the problem of handling variable multiplexing ratios. For example, it is difficult to design the time-sliced state machine mentioned above to handle some random combination of STS-3, STS-12 and STS-48 payloads that can be packed into an STS-192 frame, due to the varying nature of the bandwidth and the data bus widths involved in handling the different sub-streams. In addition, the sub-rate payloads may be placed at arbitrary locations within the multiplexed frame stream; as a result, a large number of combinations of widths and starting locations are possible, causing the design of the time-sliced processor to become extremely complex. Moreover, the time-sliced design is difficult to extend to higher and higher speeds (e.g., extending the data rate from STS-48 to STS-192 or even STS-768 is not simple).

The shortcomings of the known techniques lie primarily in their extension to higher speeds (OC-192 and above), along with higher degrees of channelization. While this problem has not to date been commonly encountered it will in the future become an issue as faster SONET rates (STS-192 and higher) have only recently begun to be used. The problem becomes significant only when these higher rates need to be processed. It is possible to use fairly ad-hoc, brute-force solutions at the lower speeds (STS-48 and below), however, these solutions are not suitable for higher speeds. At STS-192 rates, for example, the clock rate required for byte-by-byte processing is 1.25 GHz, rising to 5 GHz for STS-768; this is impracticable with readily available CMOS technology.

The design of a suitable data conversion network for accommodating the possible combinations of sub-rate payloads is further complicated by higher degrees of channelization. For example, a common technique used at low data rates is to employ an array of shift registers that is programmed to convert and multiplex the sub-rate payloads to and from the higher-rate frame stream. However, the utilization of arrays of shift registers is problematic at higher speeds and degrees of channelization, because the complexity and resource consumption of the network becomes very large when the width of the buses increases. For instance, a 16-byte TDM bus width would entail a 128-bit×128-bit array of shift registers and multiplexing logic, and would require significant added complexity in its design to support variable channelizations.

In a co-pending patent application, Multi-Stream Merge Network for Data Width Conversion and Multiplexing, U.S. Ser. No. 09/812,821, filed Mar. 21, 2001 (hereafter referred to as the "multi-stream merge network") which is incorporated herein by reference, can instead be used to simplify the design of the data conversion network, as well as that of the time-sliced processor. The multi-stream merge network has the desirable property that multiple simultaneous independent streams of different widths can be supported within the same network by a simple configuration process. In addition, all of these disparate streams are converted to a simple, constant-width, repeating TDM data stream by the network.

In order to overcome the aforementioned shortcomings of the prior art, the present invention seeks to provide a data conversion network or arrangement, containing the multi-stream merge network coupled with a time-sliced processor which would alleviate the problems of handling variably multiplexed SONET payloads using a simple time-division multiplexing system.

SUMMARY OF THE INVENTION

The present invention provides a multiplexed payload system for processing data organized in any interleaved framing structure, preferably SONET. Along a receive path, the system consists of an input shift register, an input multi-stream merge network, a time-sliced processing unit, and a context memory. Similarly, along a transmit path, the system consists of an output shift register, an output multi-stream merge network, a time-sliced processing unit, and a context memory. The transmit path functions in an identical manner to the receive path but in the reverse direction. The multi-stream merge network, in either direction, converts between spatially separated input data streams of various configurable widths and time-division-multiplexed streams of constant width. The input shift register and the output shift register serve to accept a serial stream of bytes from the data receiver and convert them to a parallel stream of bytes presented to the input multi-stream merge network, or to accept a parallel stream of bytes from the output multi-stream merge network and convert them to a serial stream of bytes to the data transmitter, respectively. The context memory stores the processing contexts for sub-rate payload streams derived from the serial stream of bytes. A separate context memory location is assigned to each sub-rate payload stream that is received or transmitted. The time-sliced processing unit retrieves processing contexts from the context memory in a fixed sequence and uses the processing contexts to process data presented by the input multi-stream merge network, or generate data presented to the output multi-stream merge network.

The multiplexed payload processing system of the present invention seeks to achieve several criteria. The first criterion is the utilization of a single time-sliced payload processor to handle arbitrary combinations of sub-rate payloads. These combinations are multiplexed into a single frame stream; the only limitation on the sub-rate payloads is that they should be related to the overall frame rate by powers of 2; e.g., STS-3 rates or higher in the case of SONET. The second criterion is that the time-sliced processor should be independent of the rates and formats of the various sub-rate payloads. According to a third criterion, the system must accommodate any arbitrary multiplexing sequence (i.e., the assignment of time-slots in the higher-rate frame to sub-rate payloads cannot be constrained). A final criterion is that the system operation must follow a fixed and repetitive sequence, thereby permitting simple configuration and control structures.

The detailed description of the present invention assumes a SONET frame stream with an STS-48 frame rate together with a 16-byte datapath width. However, the present invention may be embodied in any legal higher-bandwidth SONET frame rate, without sacrificing the granularity of multiplexing. For example, it is obvious that supporting an STS-192 frame rate that contains sub-rate payloads at the STS-3c level may be done by increasing the datapath widths to 64 bytes rather than 16 bytes. The same datapath could also be used, for instance, to support an STS-768 frame rate at STS-12c granularity.

The time-sliced processing unit functions independently of the multiplexing granularity and complexity of the incoming SONET frame stream. It is only necessary for the time-sliced processing unit to be able to process a given time-slot of data within the time occupied by the time-slot. The multi-stream merge network is responsible for eliminating the need for the time-sliced processing unit to deal with byte interleaving or to handle data blocks from different payloads that may be present in the same data word. In addition, the sequence of time-slots presented to the time-sliced processing unit is fixed and regular. The time-sliced processing unit is thus greatly simplified.

Furthermore, the system is capable of high processing rates. As disclosed in the aforementioned co-pending patent application, U.S. Ser. No. 09/812,821, the input and output multi-stream merge networks are very regular, highly pipelined, and have extremely simple control logic; they can thus be designed and implemented to run at relatively high clock rates with respect to the capabilities of the underlying semiconductor technology. Finally, the time-sliced processing unit has been substantially simplified by the use of the multi-stream merge networks, and hence can be designed for high performance (approaching that of a non-time-sliced, dedicated, processing unit). Thus, the present invention is amenable to the processing of multiplexed STS-192 and STS-768 payloads, even when the granularity of multiplexing is relatively small.

In a first aspect, the present invention provides a multiplexed payload processing system comprising:
  an input data conversion network including a multi-stream merge network, having means for receiving parallel streams of variable-width data which are spatially separated on an input data bus;
  means for converting said parallel streams of data of variable width into a time-division-multiplex (TDM) data stream of constant width;
  means for outputting said TDM data stream onto a TDM bus; and
  a time-sliced processing unit having means for receiving said TDM stream of data from said TDM bus;
  means for extracting payload information from said TDM stream of data;
  means for processing said payload information in a fixed repetitive manner; and
  means for outputting the results on to an output data bus.

In a second aspect, the present invention provides a method of demultiplexing and processing a payload along a receive path, including the steps of:
  a) receiving a parallel stream of spatially-multiplexed, variable-width data from an input data bus;
  b) transferring said parallel stream of variable-width data to an input data conversion network utilizing a multi-stream merge network;
  c) converting said parallel stream of variable-width data into a fixed and repetitive time-division-multiplex (TDM) stream of constant-width data;
  d) extracting payload data from said TDM stream of constant-width data;
  e) providing a context memory;
  f) retrieving context information for each of said constant width-data from said context memory;
  g) processing said extracted payload data using said context information to generate result data;
  h) outputting said result data onto an output data bus; and
  i) updating the context information in said context memory.

The above aspects cover the functionality needed to perform the processing of received frame streams. It will be obvious to persons skilled in the art that the processing of transmit frame streams can be implemented by simply reversing the order of processing steps or functional blocks.

BRIEF DESCRIPTION OF THE DRAWINGS

The present invention will now be described with reference to the drawings, in which.

DETAILED DESCRIPTION

Figure 1:
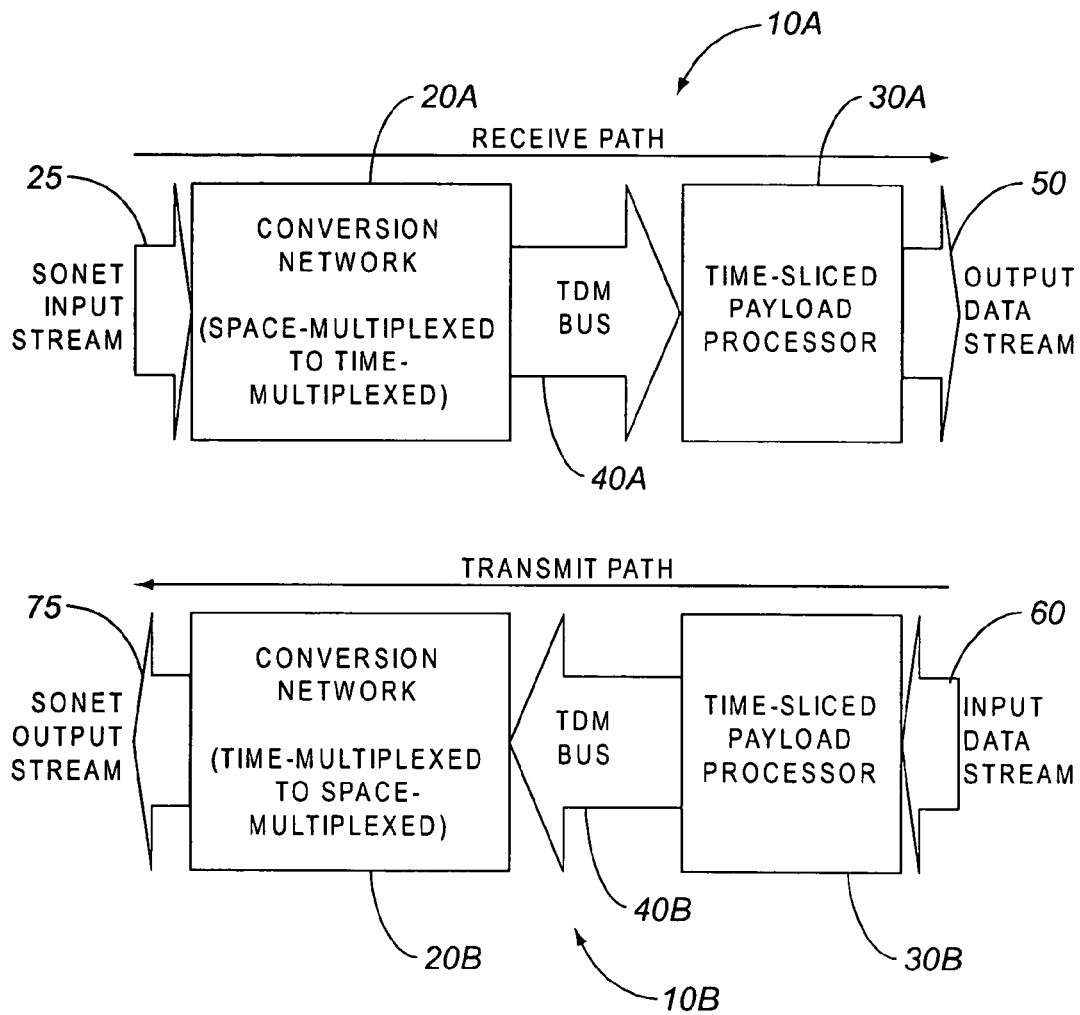
FIG. 1 is a block diagram illustrating a data conversion network (which contains a multi-stream merge network) coupled to a time-sliced payload processor unit according to the present invention.

FIG. 1 illustrates a block diagram of the multiplexed SONET payload processing system 10A in the receive path, and 10B in the transmit path, according to the present invention. In the receive path, the SONET transmission system 10A consists of a data conversion network 20A coupled to a time-sliced payload processor unit 30A. The function of the data conversion network 20A is to accept byte-interleaved SONET frames 25 and transform them to a time-division-multiplexed (TDM) data representation on a TDM bus 40A. The SONET frames 25 may be derived from any combination of sub-rate payloads. The TDM representation selected enables the time-sliced payload processor 30A to process any combination of sub-rate payloads that have been multiplexed to create the SONET frames 25. Finally, the payload processor 30A produces an output data stream 50. The use of the data conversion network 20A is advantageous in that it removes the multiplexing complexity and presents a uniform and consistent data representation to the payload processor 30A.

In FIG. 1, the transmit path functions are reversed but otherwise function in an identical manner to the receive path. A multiplexed SONET payload processing system 10B is illustrated in the transmit path. An input data stream 60 is received by the time-sliced payload processor 30B for processing. The payload processor 30B outputs the TDM data representation onto a TDM bus 40B. The TDM data representation is received by the data conversion network 20B. Finally, the data conversion network generates and outputs byte-interleaved SONET frames 75.

For example, consider an STS-192 SONET payload that is created from four byte-interleaved STS-48 sub-rate payloads. In the receive direction, each incoming STS-192 SONET frame 25 consists of sets of 4 bytes, each byte belonging to a different STS-48 sub-rate payload. Presenting such a stream directly to a payload processor would render the processor's task very complex. The straightforward approach of processing the payload data a byte at a time would require the payload processor 30A to have to run at extremely high rates (processing byte-level data at 1.25 Ghz).

Alternatively, the payload processor could be designed to run at a lower clock rate, but only in conjunction with a complex and expensive shift register or memory system that would accumulate bytes from each sub-rate payload until there was sufficient data to occupy a wider datapath word. Both problems are eliminated according to the present invention. Thus, for example, if it was preferred to design an input time-sliced processor unit 150 that processed data in variable-sized blocks rather than fixed-size units (e.g., in the case of handling variable-sized packet information), it would be possible to use these logical FIFOs 610A to accumulate data for the various sub-rate payloads prior to initiating processing for the payloads. The logical FIFOs 610A can also be used to overcome constraints on the operation of the input time-sliced processing unit 150, e.g., a limit on the spacing between consecutive words from the same channel, or a limit on the number of words that may be processed for a channel at a time. A similar capability can be obtained for the output time-sliced processor unit 180 with the use of logical FIFO buffers 610B between it and the output merge unit 170. The implementation of an array of logical FIFOs 610A, 610B between it and the output merge unit 170. The implementation of an array of logical FIFOs 610A, 610B is well known to a person skilled in the art and as such will not be covered in more detail in this document.

According to the present invention, the data conversion network 20A is used to separate the bytes belonging to the four different STS-48 sub-rate payloads and group consecutive bytes from each STS-48 payload together into words. The words in turn are output onto the TDM bus 40A to the payload processor 30A. The TDM data representation allows the payload processor 30A to work on data from a single STS-48 payload at a time, and also to receive a full word of data (rather than a byte, or a partial word) to process at a given time. It should be mentioned that, according to the present invention, the word width may be set to any number of bytes that is a power of 2; hence the payload processor may be designed to run much slower than the byte-level data rate of the incoming frame stream. In the above example, a 16-byte datapath width would enable the payload processor to run at about 77 MHz, instead of the normal 1.25 GHz byte data rate of an STS-192 frame stream.

Figure 2:
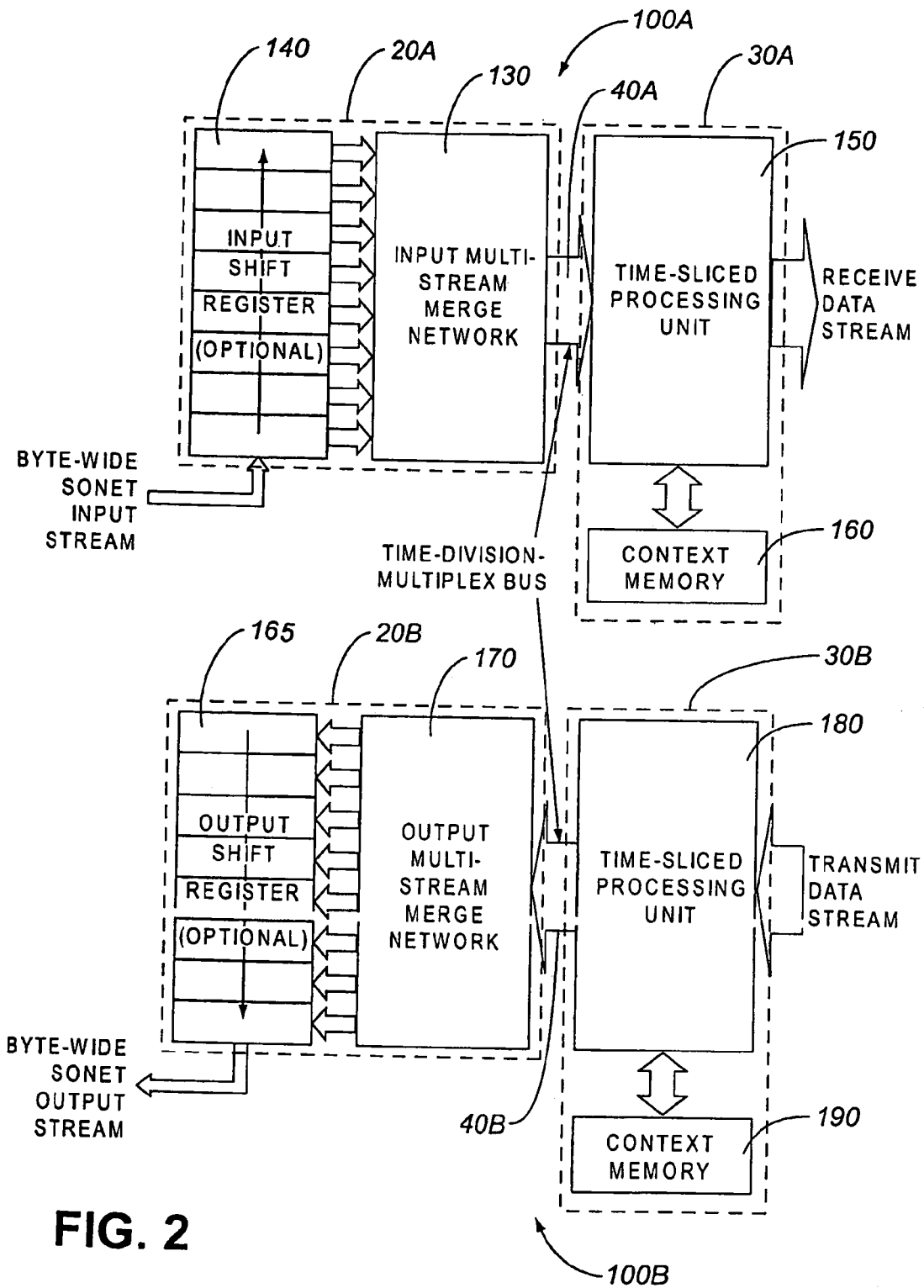
FIG. 2 is a block diagram illustrating the components of the SONET transmission system according to a first embodiment of the present invention.

FIG. 2 illustrates the multiplexed SONET payload processing system in the receive path 100A, and in the transmit path 100B, according to an embodiment of the present invention. The system 100A consists of a data conversion network 20A and a payload processor 30A of FIG. 1. The data conversion network 20A comprises an input multi-stream merge network 130 and an input shift register 140. The payload processor 30A consists of a time-sliced processing unit 150 in communication with context memory means means 160. As in FIG. 1, the data conversion network 20A outputs a TDM sequence of data words onto a TDM bus 40A.

It should be noted that the input and output multi-stream merge networks 130, 170 utilized are discussed in the co-pending U.S. patent application Ser. No. 09/812,821. As such, it is assumed that the details of the multi-stream merge network are available to a person skilled in the art and need not be discussed in detail in this document.

The input shift register 140, while not essential, is utilized when the received SONET information is presented in byte-serial form. The purpose of the input shift register 140 is to convert the byte-serial SONET data to a byte-parallel format. A standard shift register mechanism is used to convert the byte-wide data input to a word-wide data output, with the word width being selected to match that of the datapath. Note that the word width is constrained to be a power of 2, and is also dictated by the smallest sub-rate payload that must be processed by the system 10A.

The input multi-stream merge network 130 accepts the word-wide inputs in a parallel form, either from the input shift register 140, or directly from some external SONET receive logic. The multi-stream merge network 130 performs a transformation such that each sub-rate payload present within the multiplexed SONET frame at its input occupies one or more time-slots on the time-division-multiplexed bus 40A at its output. The data produced by the input multi-stream merge network 130 is coherent and time-division-multiplexed in a regular pattern, and is related to the input data by a fixed and regular association. The number of time-slots occupied at the output by any given sub-rate payload is proportional to the bandwidth consumed by the sub-rate payload within the complete SONET frame. The word width of the input multi-stream merge network 130 is constrained to be a power of 2. This constraint applies to the output merge network 170 as well in the system 100B.

The payload processing unit 30A processes the contents of each time-slot on the TDM bus 40A according to a pre-configured payload type, and consists of a time-sliced processing unit 150 and associated context memory means 160. The time-sliced processing unit 150 accepts data from the TDM bus 40A, extracts the actual payload from the data, and processes the payload information. The time-sliced processing unit 150 operates on each time-slot in turn, reading context information from the context memory means 160 prior to processing the time-slot and writing updated context information back to the context memory means 160 after the processing is complete.

The context memory means 160 supplies per-time-slot context information to the time-sliced processing units. It is assumed that the context memory means 160 is capable of fetching and supplying context for a different sub-rate payload on each time-slot. However, the context memory means 160 is not a requirement of the present invention. The use of FIFO buffers, illustrated in FIG. 6, would further minimize the complexity of the payload processor 30A, as the use of FIFO buffers 610A eliminates the need for the payload processing unit 30A to follow a fixed time-slot sequence.

In FIG. 2, an output shift register 165, an output multi-stream merge network 170, an output time-sliced processing unit 180 and an associated context memory means 160 comprise the output, or transmit, side of the multiplexed SONET payload processing system 100B. As already mentioned in relation to FIG. 1, the output side functions in an identical manner to the input, or receive side, but in the reverse direction. According to the present invention, the time-sliced processing unit 180 and context memory means 190 work in conjunction to process and encapsulate the supplied data into sub-rate SONET payloads, and place them into pre-assigned time-slots on the output TDM bus 40B. The output multi-stream merge network 170 and the output shift register 165 also work conjointly to transform the time-division-multiplexed data, presented on the bus 40B, to a byte-interleaved arrangement of sub-rate payloads, in byte-serial form. It should be mentioned that the output shift register 165 is not required if the data are transmitted in byte-parallel form instead.

On he input side, data are fed into the input shift register 140 in byte-serial form by an external entity. (This external entity is expected to implement all required opto-electronic conversion, clock and data recovery, deserialization and SONET overhead processing). Input shift register 140 converts the byte-serial data stream to a byte-parallel data stream of the required width. This byte-parallel stream is then fed to the input multi-stream merge network 130, which will extract and group the bytes associated with each individual sub-rate stream, perform any necessary buffering and rate matching functions, and then implement the pipelined sequence of merge operations required to produce a TDM data stream at its output.

Each time-slot on the time-division-multiplexed bus 40A will contain a set of consecutive bytes from any one sub-rate payload; the coherency of the time-slots implies that data from different sub-rate payloads will not be mixed in the same time-slot, and also that the ordering of bytes within a time-slot will correspond to their serial ordering at the input. It is important to ensure that a SONET frame boundary never falls within the byte-parallel data stream presented to the input multi-stream merge network 130, otherwise the input multi-stream merge network 130 will not function properly and the time-slots will not be coherent. If the input shift register 140 is used, this may be accomplished quite simply by properly synchronizing the input shift register 140 operation to the SONET frame, such that the shifting-in sequence begins with the first byte of the frame and ends on the last byte. If the input shift register 140 is omitted, then the external apparatus generating the byte-parallel data for the input multi-stream merge network 130 is responsible for ensuring this.

The time-sliced processing unit 150 will accept data within each time-slot of the TDM bus 40A, retrieve the pre-assigned context associated with the given time-slot, and perform the necessary processing on the payload data. The processing required varies depending on the type of data being transported by the sub-rate payload with which the time-slot is associated. For example, asynchronous transfer mode (ATM) cell payloads encapsulated within a SONET synchronous payload envelope (SPE) require cell delineation, header error check (HEC) processing, idle/unassigned cell removal and cell payload descrambling. On the other hand, a Packet-over-SONET (POS) payload will require high-level data link control (HDLC) frame delineation, point-to-point protocol (PPP) and HDLC frame extraction, Frame Check Sequence (FCS) checking, flag destuffing, and payload descrambling functions. Other types of payloads will require correspondingly different operations. The output of the time-sliced processing unit 150 comprises the output of the SONET payload processor 30A, and may be cell or packet information depending on the contents of the particular sub-rate payload being processed at any instant.

Payload processing typically requires state information (for example, ATM payload processing necessitates a partial HEC value, a byte count and some state flags); this state information is obtained from the context associated with that time-slot within the context memory means 160. At the end of the processing for that time-slot, the context is updated and returned to the context memory means 160. If the next time-slot corresponds to the same sub-rate payload, the updated context is fetched back into the time-sliced processing unit 150, otherwise, a different context is fetched.

Any limitations on the rate at which context information can be fetched, or the order in which data may be presented (e.g., some time-sliced processors 150 cannot handle a situation where two consecutive time-slots contain data from the same channel) can be handled using a small bank of logical FIFO buffers interposed between the multi-stream merge network 130 and the time-sliced processor 150, as will be described with reference to FIG. 6.

On the transmit side 100B, the reverse process is implemented. The time-sliced processing unit 180 requests data for the different sub-rate payloads in some fixed (and pre-configured) sequence. This data is then processed according to the type of payload: for ATM payloads, the functions performed include HEC generation, rate decoupling (insertion of idle/unassigned cells) and payload scrambling; while for packet-over-SONET (POS) payloads, it implements HDLC framing, FCS generation, flag stuffing and rate decoupling. As before, the context memory means 190 is used to hold intermediate context required during cell or frame processing, and is updated after each word of payload has been processed. The output of the time-sliced processing unit 180 feeds a TDM bus 40B that drives the output multi-stream merge network 170. Note that the arrangement of time-slots on the TDM bus 40B corresponds exactly to the order in which sub-rate payloads are processed by the time-sliced processing unit 180.

The output multi-stream merge network 170 performs the opposite function to the input multi-stream merge network 130: it disassembles and redirects the data in the time-slots to produce, at its output, a byte-parallel data stream that reflects the arrangement of sub-rate payloads that are being multiplexed to form the final SONET frame stream. The output multi-stream merge network 170 is statically configured to perform this association between input time-slots and output byte lanes, and implements all the byte reordering and buffering functions that are required to accomplish this. Finally, the output shift register 165 can be used to transform the byte-parallel output from the output multi-stream merge network 170 to a byte-serial output usable by the SONET transmit functions (SONET overhead insertion, serialization and electrical/optical conversion).

Figure 3:
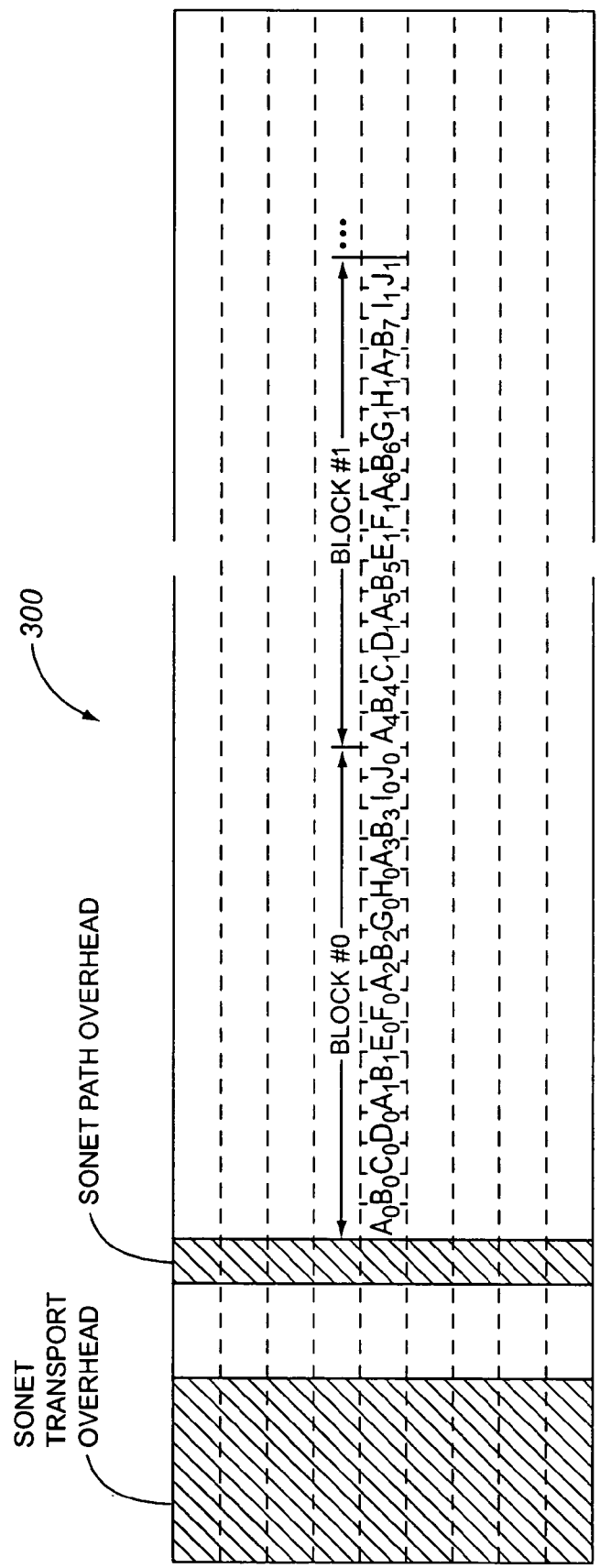
FIG. 3 is an illustration of a portion of a payload within a SONET frame processed according to the present invention.

FIG. 3 illustrates an example of the operation of the receive (input) side processing datapath. Shown in FIG. 3, in simplified form, is the structure of an STS-48 SONET frame 300 that has been multiplexed from sub-rate payloads. The SONET Transport and Path overhead are not normally processed by the system and have therefore been excluded. The remainder of the STS-48 frame 300 consists of payload information. The STS-48 frame 300 is assumed to have been multiplexed from two separate STS-12c payloads (bytes labeled "A" and "B" in FIG. 3) and eight separate STS-3c payloads (bytes labeled "C", "D", "E", "F", "G", "H", "I" and "J" in FIG. 3). A small portion of the frame payload is shown.

The order of bytes shown represents the multiplexing process specified by SONET to combine lower-order payloads into higher-order payloads. In FIG. 3, the multiplexing sequence repeats at 16-byte intervals, with 4 bytes from each of the STS-12c payloads "A" and "B" and 1 byte from each of the STS-3c payloads "C" through "J", in each block of 16 bytes. This sequence is input, byte by byte, to the input shift register 140 of the input datapath. The datapath width is required to be 16 bytes; as noted previously, the word width of the datapath must be sufficient to accommodate the lowest-order sub-rate payload (in this example, an STS-3c within an STS-48, the ratio of bandwidths being 16:1, a 16-byte datapath is required).

Figure 4:
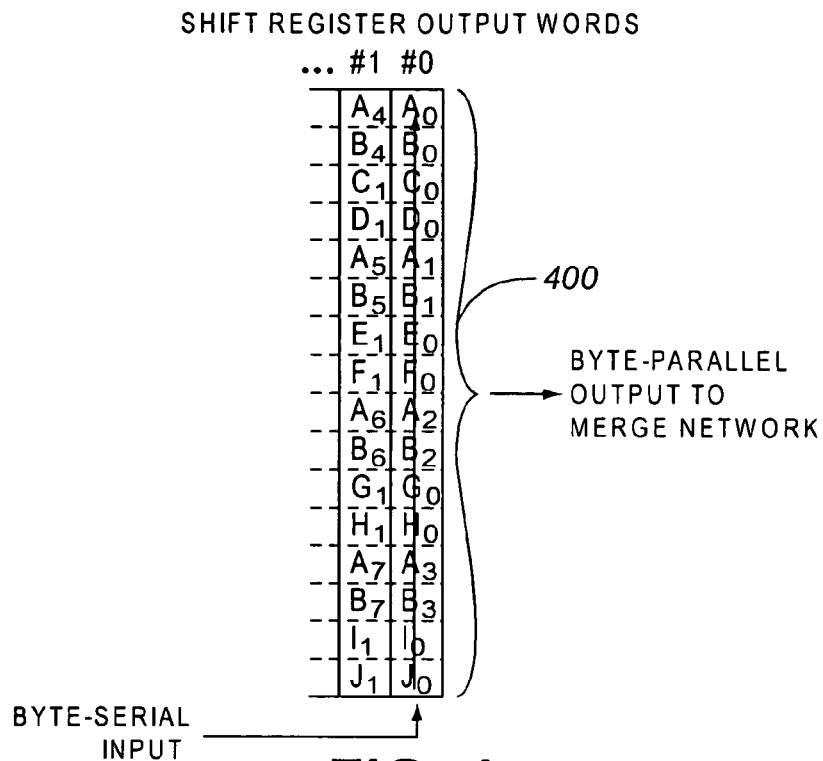
FIG. 4 is an illustration of a shift register output, in blocks of 16 bytes, according to a second embodiment of the present invention.

FIG. 4 illustrates the conversion of a byte-serial stream to a byte-parallel stream by the input shift register 140. As shown in FIG. 4, the input shift register 140 orders the bytes in the sequence in which they were received, aligns to the first byte in each 16-byte block 400, and transfers complete blocks of 16 bytes 400 to the input multi-stream merge network 130. A new block of 16 bytes 400 is transferred on every cycle. The input multi-stream merge network 130 will accept the sequence of 16-byte blocks 400 generated by the input shift register 140, and perform the requisite transformations for converting the input sequence into a time-division-multiplexed output sequence that can be processed by the time-sliced processing unit 150. The transformations include byte reordering within each block—to group bytes from the same sub-rate payload into contiguous fields—and pipelined stream merging—to convert from a serial, variable-width spatially separate set of data streams to a time-multiplexed, constant-width data stream output on a common bus. Again, this transformation is detailed in co-pending U.S. patent application Ser. No. 09/812,821.

Figure 5:
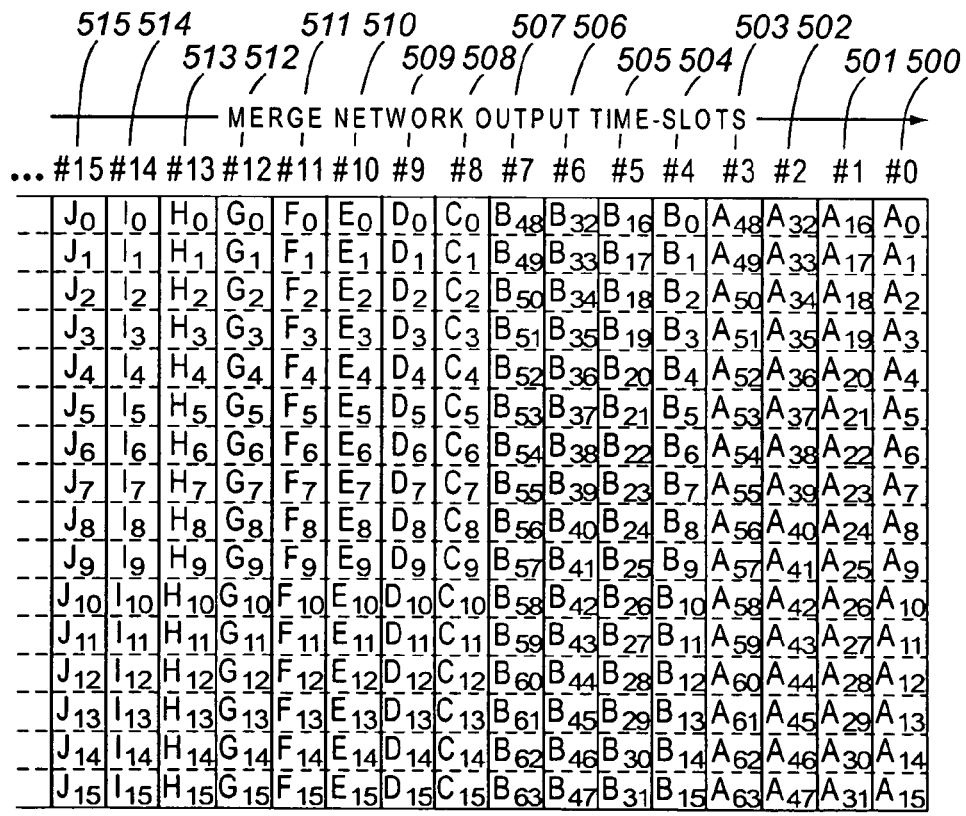
FIG. 5 is an illustration of the 16-byte blocks received from the input register and converted by the multi-stream merge network to a repeating sequence of 16 time-slots according to the present invention.

FIG. 5 illustrates the data processed by the multi-stream merge network 130 and output on the TDM bus 40A. As shown in FIG. 5, the series of 16-byte blocks is converted to a repeating sequence of 16 time-slots, 500, 501, 502, . . . , 514, 515, with the number of time-slots assigned to any given sub-rate payload being proportional to the bandwidth required by that payload. Thus the first four time-slots 500, 501, 502, 503 are filled with consecutive bytes from STS-12c payload "A", the next four timeslots 504, 505, 506, 507 with STS-12c payload "B", and the remaining eight timeslots 508, 509, 510, 511, 512, 513, 514, 515 are assigned to STS-3c payloads, in sequence, 508, 509, 510, 511, 512, 513, 514, 515. The time-slot construction is fixed (the sequence repeats without change) and coherent (each time-slot holds consecutive bytes from only one sub-rate payload). Each time-slot of 16-bytes is then passed to the time-sliced processing unit 150. The time-sliced processing unit 150 processes all of the data for one time-slot in one cycle.

The functions performed by the conversion network 20A, 20B greatly simplify the task of the time-sliced processing units 150, 180. As there is no intermingling of bytes from sub-rate payloads, and all of the bytes are presented in consecutive order, it is only necessary for the processing units 150, 180 to obtain the context corresponding to the sub-rate payload occupying each time-slot, perform the needed processing functions, and return an updated context to the context memory means 160, 190. In fact, the fixed and repeating sequence of time-slots implies that the context memory means 160, 190 and time-sliced processing units 150, 180 can be entirely decoupled in operation, whereby the context memory means 160, 190 will fetch and store context information in a predetermined order and the time-sliced processing units 150, 180 will simply accept the fetched context information and generate new context information to be stored, also in a predetermined order, without any hand-shaking or control signals between the two entities.

Figure 6:
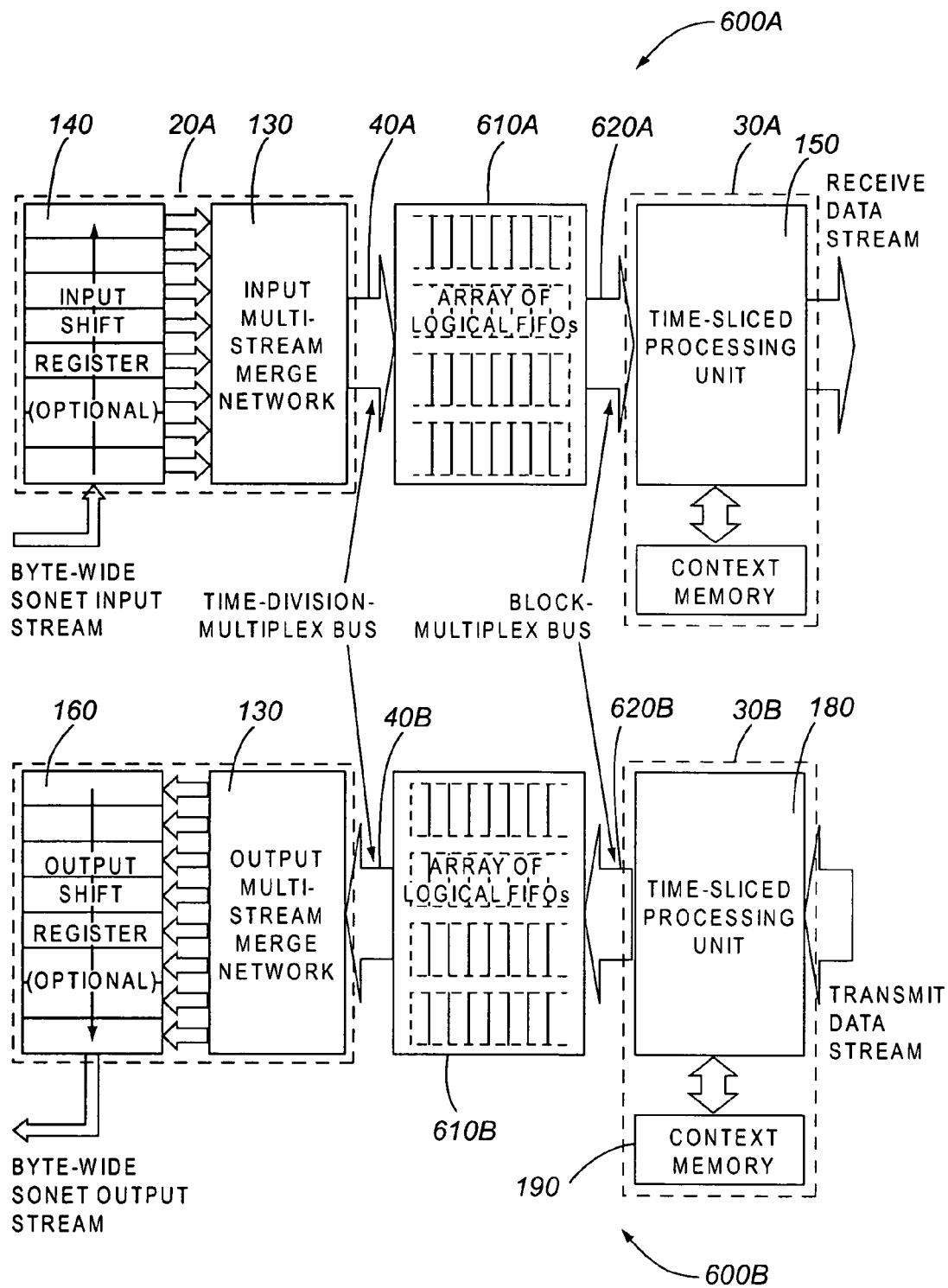
FIG. 6 is an illustration of the SONET transmission system utilizing an array of logical FIFOs in the transmit and receive datapaths according to a third embodiment of the present invention.

FIG. 6 illustrates an alternative processing system 600A, 600B of the present invention. The transmit and receive path systems 100A, 100B of FIG. 2, are further augmented with a pair of FIFO buffers 610A, 610B, interposed into the time-division-multiplexed data streams presented to the input time-sliced processor unit 150 or generated by the output time-sliced processor unit 180, respectively. The pair of FIFO buffers 610A, 610B output to and receive input from the payload processors 30A, 30B by means of the block-multiplexed buses 620A, 620B. These FIFO buffers 610A, 620A should be logically organized to provide a separate FIFO per sub-rate payload being multiplexed or demultiplexed. The provision of such FIFOs would further simplify the design of the time-sliced processor units 150, 180 by decoupling their operation from the time-slot sequence created by the input and output multi-stream merge networks 130, 170, so that both the amount of data processed at a time as well as the order in which the data are processed may be varied independently of the constraints of the input and output multi-stream merge networks 130, 170.

Thus, for example, if it was preferred to design an input time-sliced processor unit 150 that processed data in variable-sized blocks rather than fixed-size units (e.g., in the case of handling variable-sized packet information), it would be possible to use these logical FIFOs 610A to accumulate data for the various sub-rate payloads prior to initiating processing for the payloads. The logical FIFOs 610A can also be used to overcome constraints on the operation of the input time-sliced processing unit 150, e.g., a limit on the spacing between consecutive words from the same channel, or a limit on the number of words that may be processed for a channel at a time. A similar capability can be obtained for the output time-sliced processor unit 180 with the use of logical FIFO buffers 610B between it and the output merge unit 170. The implementation of an array of logical FIFOs 610A, 610B is well-known to a person skilled in the art and as such will not be covered in more detail in this document.

A person understanding the above-described invention may now conceive of alternative designs, using the principles described herein. All such designs which fall within the scope of the claims appended hereto are considered to be part of the present invention.

We claim:

1. A multiplexed payload processing system comprising:
   an input data conversion network including a multi-stream merge network, having means for receiving parallel streams of variable-width data which are spatially separated on an input data bus, the parallel streams of variable-width data being incoming Synchronous Optical Network (SON ET) frame streams;
   means for converting said parallel streams of data of variable width into a time-division-multiplex (TDM) data stream of constant width;
   means for outputting said TDM data stream onto a TDM bus as a sequence of data words; and
   a time-sliced processing unit having means for receiving said TDM stream of data words from said TDM bus;
   means for extracting payload information from said TDM stream of data words;
   means for processing said payload information in a fixed repetitive manner; and
   means for outputting the results on to an output data bus.

2. A multiplexed payload processing system as defined in claim 1, further comprising:
   a context memory having means for fetching and supplying context information to said time-sliced processing unit for each of said data words received from said TDM bus; and
   means for storing updated context information received from said time-sliced processing unit; wherein said time-sliced processing unit utilizes said context memory for processing said payload information.

3. A multiplexed payload processing system as defined in claim 1, wherein the payload information being extracted and processed comprises the payload portion of a frame of said incoming SONET frame stream.

4. A multiplexed payload processing system as defined in claim 1, further including an input shift register stage for converting a serial stream of data received at an input side to a parallel stream of data for output to said input data conversion network.

5. A multiplexed payload processing system as defined in claim 2, further including an input shift register stage for converting a serial stream of data received at an input side to a parallel stream of data for output to said input data merge network.

6. A multiplexed payload processing system as defined in claim 1, further including an array of logical FIFO buffers for buffering the TDM data stream located between said input data conversion network and said time-sliced processing unit, whereby the operation of said time-sliced processing unit is decoupled from that of said input data conversion network.

7. A multiplexed payload processing system as defined in claim 6, wherein said time-sliced processing unit includes means for processing variable-sized data blocks in a non-repetitive manner irrespective of the ordering of data on said TDM bus.

8. A multiplexed payload processing system as defined in claim 2, further including an array of logical FIFO buffers for buffering the TDM data stream located between said input data conversion network and said time-sliced processing unit, whereby the operation of said time-sliced processing unit is decoupled from that of said input data conversion network.

9. A multiplexed payload processing system as defined in claim 8, wherein said time-sliced processing unit includes means for processing variable-sized data blocks in a non-repetitive manner irrespective of the ordering of data words on said TDM bus.

10. A multiplexed payload processing system comprising:
   a time-sliced processing unit having means for receiving a stream of data words from an input data bus;
   means for processing information contained in said stream of data;
   means for generating and outputting a time-division-multiplex (TDM) stream of constant-width data words onto a TDM bus in a fixed and repetitive manner; an output data conversion network including a multi-stream merge network, having means for receiving said fixed TDM stream of constant-width data from said time-sliced processing unit;
   means for converting said TDM stream of constant-width data words into spatially-separated parallel streams of variable-width data, said parallel streams of variable-width data being multiplexed outgoing SONET frame streams; and
   means for multiplexing said parallel streams of data on to an output data bus.

11. A multiplexed payload processing system as defined in claim 10, wherein:
   said time-sliced processing unit includes means for receiving a stream of data words in a fixed repetitive manner;
   means for processing a set of payload data contained in the stream of data in a fixed repetitive manner,
   means for generating and outputting a fixed TOM stream of data output onto a TDM bus;
   a context memory having means for fetching and supplying context information to said time-sliced processing unit for said data received from said input data bus; and
   means for storing the updated context information received from said time-sliced processing unit; wherein said time-sliced processing unit utilizes said context memory for generating said fixed TDM stream of data in a given time slot.

12. A multiplexed payload processing system as defined in claim 11, further including an output shift register stage for converting a parallel stream of data generated by said output data conversion network to a serial stream of data.

13. A multiplexed payload processing system as defined in claim 11, wherein the output shift register stage is an output shift register connected to the output merge network.

14. A multiplexed payload processing system as defined in claim 10, further including an array of logical FIFO buffers for buffering the TDM data stream located between said output data conversion network and said time-sliced processing unit, whereby the operation of said time-sliced processing unit is decoupled from that of said output data conversion network.

15. A multiplexed payload processing system as defined in claim 14, wherein said time-sliced processing unit includes means for processing variable-sized data blocks in a non-repetitive manner irrespective of the required ordering of data on said TDM bus.

16. A multiplexed payload processing system as defined in claim 11, further including an array of logical FIFO buffers for buffering the TDM data stream located between said output data conversion network and said time-sliced processing unit, whereby the operation of said time-sliced processing unit is decoupled from that of said output conversion network.

17. A multiplexed payload processing system as defined in claim 16, wherein said time-sliced processing unit includes means for processing variable-sized data blocks in a non-repetitive manner irrespective of the required ordering of data on said TDM bus.

18. A method of demultiplexing and processing a payload along a receive path, including the steps of:
   a) receiving a parallel stream of spatially-multiplexed, variable-width data from an input data bus;
   b) transferring said parallel stream of variable-width data to an input data conversion network utilizing a multi-stream merge network;
   c) converting said parallel stream of variable-width data into a fixed and repetitive time-division-multiplex (TDM) stream of constant-width data;
   d) extracting SONET TDM payload data comprising multiple frame streams from said TDM stream of constant-width data;
   e) providing a context memory;
   f) retrieving context information for each of said constant width-data from said context memory;
   g) processing said extracted payload data using said context information to generate result data;
   h) outputting said result data onto an output data bus; and
   i) updating the context information in said context memory.

19. A method of multiplexing and processing a payload along a transmit path, including the steps of:
   a) receiving a stream of constant-width data containing SONET TDM payload data comprising multiple frame streams from an input data bus;
   b) providing a context memory;
   c) retrieving context information for each of said constant-width data words from a context memory;
   d) processing said payload data using said context information to generate a fixed and repetitive TDM stream of data;
   e) outputting said fixed and repetitive TDM stream of data to a TDM bus;
   f) updating said context information in said context memory;
   g) converting said fixed and repetitive TDM stream of data into spatially-multiplexed, variable-width parallel streams of data using a data conversion network based on a multi-stream merge network; and
   h) multiplexing said variable-width parallel streams of data to an output data bus.

* * * * *